United States Patent
Wood

[19]

[11] Patent Number: 6,021,374
[45] Date of Patent: Feb. 1, 2000

[54] STAND ALONE TERRAIN CONFLICT DETECTOR AND OPERATING METHODS THEREFOR

[75] Inventor: Charles T. Wood, Orange, Calif.

[73] Assignee: McDonnell Douglas Corporation, St. Louis, Mo.

[21] Appl. No.: 08/947,468

[22] Filed: Oct. 9, 1997

[51] Int. Cl.[7] .................. G06F 163/00; G06F 165/00
[52] U.S. Cl. .................. 701/301; 701/120; 701/213; 701/216; 701/208; 244/175
[58] Field of Search .................. 701/301, 120, 701/213, 216, 208; 244/175

[56] References Cited

U.S. PATENT DOCUMENTS

| | | | |
|---|---|---|---|
| 4,144,571 | 3/1979 | Webber | 364/450 |
| 4,571,684 | 2/1986 | Takanabe et al. | 364/449 |
| 4,646,244 | 2/1987 | Bateman et al. | 364/461 |
| 4,939,663 | 7/1990 | Baird | 364/449 |
| 5,089,816 | 2/1992 | Holmes, Jr. | 340/995 |
| 5,260,709 | 11/1993 | Nowakowski | 342/62 |
| 5,313,201 | 5/1994 | Ryan | 340/961 |
| 5,365,449 | 11/1994 | Kashiwazaki | 364/449 |
| 5,396,431 | 3/1995 | Shimizu et al. | 364/449 |
| 5,406,489 | 4/1995 | Timothy et al. | 364/434 |
| 5,414,631 | 5/1995 | Denoize et al. | 364/461 |
| 5,442,556 | 8/1995 | Boyes et al. | 364/433 |
| 5,471,205 | 11/1995 | Izawa | 364/995 |
| 5,488,563 | 1/1996 | Chazelle et al. | 364/461 |
| 5,535,125 | 7/1996 | Okabe | 364/449 |
| 5,548,515 | 8/1996 | Pilley et al. | 701/120 |
| 5,574,648 | 11/1996 | Pilley | 701/120 |
| 5,574,649 | 11/1996 | Levy | 364/449 |
| 5,615,116 | 3/1997 | Gudat et al. | 701/23 |
| 5,809,457 | 9/1998 | Yee et al. | 701/220 |
| 5,841,370 | 11/1998 | Lempicke. | |
| 5,864,307 | 1/1999 | Henley | 340/964 |
| 5,867,804 | 2/1999 | Pilley et al. | 701/120 |
| 5,884,219 | 3/1999 | Curtwright et al. | 701/213 |

*Primary Examiner*—William A. Cuchlinski, Jr.
*Assistant Examiner*—Olga Hernandez
*Attorney, Agent, or Firm*—Westerlund•Powell, P.C.; Raymond H. J. Powell, Jr.; Robert A. Westerlund

[57] ABSTRACT

A stand alone terrain conflict detector of an aircraft includes a global positioning system (GPS) receiver, an inertial navigation system, navigational and topographical databases, a control panel, a central processing unit (CPU), which CPU generates position data, a current flight path vector and control signals, an obstacle detector which receives the position data and the current flight path vector and which generates a flight path signal, an alert signal identifying a terrain threat to the aircraft and a projected flight path vector, a video generator coupled to the obstacle detector and the CPU, and a display connected to the video generator. The display outputs one of a 2D image, a first 3D image and a second 3D image and the terrain threat generated by video generator. Advantageously, the video generator generates the 2D image responsive to the flight path signal and navigational data during the first mode of operation, generates the first 3D image including the projected flight path vector responsive to the flight path vector and one of navigational data and topographical data during the second mode of operation, and automatically generates, whenever the alert signal is generated, the second 3D image, including an escape vector, having a scale different than that of the first 3D image, responsive to the projected flight path vector and one of the navigational data and the topographical data during the third mode of operation. A method for operating the stand alone terrain conflict detector is also described.

17 Claims, 16 Drawing Sheets

STAND ALONE TERRAIN CONFLICT DETECTOR AND OPERATING METHODS THEREFOR

BACKGROUND OF THE INVENTION

The present invention relates generally to terrain conflict detectors for aircraft. More specifically, the present invention relates to stand alone terrain conflict detectors employing three dimensional (3D) representations of conflicts and avoidance vectors. Advantageously, methods for operating the stand alone terrain conflict detector are also disclosed.

An unacceptable number of aircraft crashes occur every year. In fact, this number has, on average, shown no significant sign of diminishing, in spite of advances in almost every aspect of aircraft technology. For example, most aircraft are now equipped with an inertial navigation system which allows them to determine their position after any interval from take-off. The inertial navigation system provides the components of the velocity and acceleration vectors of the aircraft as well as the components of the associated angles. It is possible to derive position data from this data; however, the position has a degree of uncertaintiy associated with it. The position data from the inertial navigation system may be compared with position data provided by other radio navigational means, e.g., from a so-called Global Positioning System (GPS), which relies on satellites and which provides fairly precise position data with respect to latitude and longitude. Newer GPS systems can establish the aircraft position and altitude by triangulation using four or more satellites.

Even with these increasingly sophisticated systems providing position information, aircraft are still lost every year. Investigations into the causes of aircraft crash incidents frequently reveal that the aircraft was operating normally when the crash occurred, i.e., the cause of the crash incident could not be attributed to a system fault. In these types of incidents, often referred to as a Controlled Flights into Terrain (CFIT) accident or event, the cause is given as pilot error. However, although the pilot may have contributed to the event, had he been given sufficient warning that, for whatever reason, the aircraft was in imminent danger of crashing, evasive action could have been taken and ground contact avoided.

Systems which alert pilots to the fact that the flight path of their aircraft will intersect an obstacle or will make a close approach to such an obstacle are generally known. For example, U.S. Pat. No. 4,646,244 to Bateman discloses a system which utilizes Global Positioning Satellite (GPS) information to determine the aircraft's position. The position information is used to access stored data which can, in conjunction with the aircraft's position, provide an indication of the nature and location of the obstacles in the vicinity of the aircraft as well as the nature of the terrain. In the Bateman patent, the shapes and contours of the terrain are approximated by simple geometric shapes, e.g., boxes and triangles. When the flight path of the aircraft falls within a determined envelope, an aural warning is sounded. Additionally, U.S. Pat. No. 5,414,631 to Denoize. et al. discloses a system which also uses GPS signals and an alarm system to warn of approaching obstacles. The Denoize patent establishes a "floor" which in turn establishes a general minimum altitude that will provide obstacle clearance. The Denoize et al. patent uses the predicted flight path to warn pilots any time the aircraft is headed below this "floor." It will be appreciated that both of the above-described systems provide a warning of obstacles in the fligh path but provide no guidance regarding an escape maneuver.

Several recent systems which provide limited obstacle avoidance information are disclosed in U.S. Pat. No. 5,443,556 to Boyes et al. and U.S. Pat. No. 5,448,563 to Chazelle et al. These patents are discussed in detail immediately below.

The patent to Boyes et al. discloses aircraft terrain and obstacle avoidance systems which provide a warning signal whenever the aircraft is on a potentially hazardous course with respect to the terrain and obstacles which must be overflown. As illustrated in FIG. 1, the avoidance system proposed by Boyes et al., which is carried on-board an aircraft, includes:

1. an aircraft navigation system 11;
2. a computer system 15 having first, second, third and fourth computer sub-systems 17, 19, 21, respectively; and
3. A map data storage device 25.

It will be appreciated that the navigation system 11 develops outputs representative of aircraft geographical position in three dimensions, latitude, longitude, and altitude, respectively, of the aircraft, aircraft velocity V, again in three dimensions East (E), North (N), and Down (D) respectively, and aircraft attitude R, P, H, i.e., roll $\phi$, pitch $\theta$, and heading $\psi$ angles, respectively. The navigation system generates data representative of horizontal uncertainty PH (aircraft geographical position) and uncertainty PV (aircraft height). Aircraft altitude, (alt.) is derived by measurement.

The first computer sub-system 17 receives the horizontal uncertainty output PH from the navigation system 11 and develops outputs defining a notional navigation uncertainty grid pattern, as illustrated in FIG. 2. The second computer sub-system 19, upon receipt of outputs of aircraft present velocity, attitude, and geographical position from the navigation system 11, computes aircraft acceleration using the velocity input and develops outputs representative of the forward displacement of a reference point RP along the aircraft present flight path FP relative to aircraft present position CP. The third computer sub-system 21 receives the outputs of the second computer sub-system 19 and the output of the first computing sub-system 17, and develops, for each of several positions along the aircraft flight path, an output representing a multiplicity of sets of hypothetical pull-up trajectories. The output developed by the third computer sub-system 21 is applied to the fourth computer sub-system 23, which is also connected to the map data storage device 25. The fourth computer sub-system 23 additionally receives, from the navigation system 11, the output representative of aircraft height uncertainty PV.

The fourth computing sub-system 23 is operable, in the event that a predetermined relationship is detected between terrain and obstacle digital map data derived from the map data storage device 25 and the co-ordinates of any point along any notional trajectory in any of the multiplicity of trajectory sets, allowing for uncertainties in trajectory height measurement, to develop a warning signal at an output O/P. The predetermined relationship detected is that the aircraft height for any point along a trajectory, allowing for uncertainty, is equal to or less than the height for the terrain location corresponding to that point which is stored in the storage device 25. Thus, a warning signal is produced if the terrain area, i.e. search area, defined by the multiplicity of trajectory sets includes a point which is of greater height than the aircraft would have at the trajectory point corresponding to that search area point. It will be appreciated that since the trajectory sets relate to a reference point RP on the aircraft flight path forward of the current position CP of the aircraft, appropriate evasive action taken by the pilot in response to the warning signal will avoid terrain or obstacle contact by the aircraft.

In short, the system computes pull-up trajectories which the aircraft could carry out at a reference point (RP) on the current aircraft flight path (FP) forward of the aircraft current position (CP), taking into account uncertainties such as aircraft position, which trajectories collectively define a region moving ahead of the aircraft at a spacing ahead of the aircraft which is a function of aircraft velocity and acceleration and aircraft dynamic response to pilot demands and pilot reaction time, and therefore constitutes a region which the aircraft can imminently overfly. See FIG. 2. A warning signal is produced if any point on the trajectories has a predetermined relationship with data stored in a map data storage means containing height data relating to the region defined by the trajectories.

In contrast, U.S. Pat. No. 5,488,563 discloses a device for preventing collisions with the ground for an aircraft which includes a memory storing a data base representing a substantial part of the terrestrial globe in a grid configuration, wherein details are stored in greater detail, i.e., the grid is more precise, in the vicinity of an airport. Status indications are received representing the position of the aircraft in three dimensions, velocity and acceleration vectors of the aircraft, as well as control indications coming from the flight deck. In response to aircraft position, a temporary local map is transferred into a fast access memory. The map is used to establish an altitude envelope for the terrain in the vicinity of the aircraft. Anticollision processing is then performed; an alarm is sounded if the relation between a protection field and the altitude envelope meets a first condition which is defined at least partly by the control indications.

More specifically, the Chazelle et al. patent discloses a system illustrated in FIG. 3 which includes equipment 2 providing indications of the flight parameters. In particular, the equipment 2 generally includes, as illustrated in FIG. 4:

1. an inertial unit 20 or NU;
2. a radio navigational instrument 21, e.g., GPS system with its antenna; and
3. a radio altimeter 22 with its antenna.

The inertial unit 20 provides the components of the velocity vector (V) and the acceleration vector (A) of the aircraft, which may be used to derive characteristic angles such as the angle of incidence, yaw, slope, pitch, heading, bank, etc. For determining altitude, the inertial unit cooperates in the known way with a barometric altimeter (not shown).

The radio navigational instrument 21 provides uncorrected measurements of the latitude L1, longitude G1 and altitude Z1 (=Zgps) updated at a sequence p1 ranging from a few seconds to a few minutes. By integration of the velocity and acceleration vectors, the inertial unit 20 provides other measurements of the latitude L0, longitude G0 and altitude Zp (=Zbi). As illustrated in FIG. 4, a block 25 compares the two types of measurement and validates the values L1, G1, Z1, if they are consistent with L0, G0, Z0. The validated measurements L2, G2, Z2 are available at the time sequence p1. But they are upgraded from the inertial unit at a time sequence p2 of approximately one second. A block 28 extrapolates then the data between the last instant of measurement by the instrument 21 and the current instant. The radio altimeter 22 delivers the height above the ground, designated HRS.

A block 3, which contains a terrain file, is accessed using the values of L and G to thereby extract a local map, which and stored in a local memory. On the basis of this local map and the values of L, G, Z, and HRS, the block 4 performs anti-collision calculations, preferably accompanied by ground avoidance calculations. When a risk of collision is present, an alarm (51) is emitted. An order director 53 may also suggest an avoidance manoeuver which is conveyed to the flight deck. The local map may also be used for generating a synthetic image (60) with its visualization device 55.

The first two patents discussed above cannot provide the user with information which will assist him/her in avoiding the obstacle; these systems merely provide an audible warning whenever the projected flight path of the aircraft intersects the space occupied by the obstacle. More sophisticated systems, such as those described in the Boyes et al. and Chazelle et al. patents, generate escape vectors, which generally indicate the climb rate needed to achieve an altitude high enough to avoid the obstacle. Since these systems define airspace sections in terms of the highest point in a respective section, pilots relying on such systems would be forced to avoid, i.e., fly over, one or more airspace sections in order to avoid a single obstacle within those airspace sections even though the airspace sections could be safely navigated by the expedient of altering the aircraft's flight path by a few degrees. It will be appreciated that by dictating non-optimal solutions, pilots are forced to waste time and fuel to avoid obstacles.

Moreover, the systems discussed above have several features in common which make it difficult for them to gain wide acceptance in either commercial or private aviation communities. For example, several of the systems discussed above are programmed with both the performance capabilities of the aircraft and the reaction time of the pilots. Thus, many of the systems discussed above must be custom fit to the aircraft in which they are installed; the reaction time of the pilots is most probably programmed into these systems during pre-flight operations.

In addition, several of these systems, i.e., the system disclosed in U.S. Pat. No. 5,488,563, generate synthetic imagery, e.g., wire frame images based on the highest point in each map section. It will be appreciated that such representation do not convey significant intelligible information to the user of the system. In short, the collision warning is provided to the user, who cannot truly appreciate the danger given the displayed information.

Moreover, the systems discussed above are engineered to provide "just in time" warnings, since these systems take into account the performance capabilities of both the aircraft and the crew. These systems do not provide the flight crew with enough detailed information to assist the crew in assessing the danger and to assist the crew in arriving at an optimum solution to avoid a CFIT event.

Additionally, the systems disclosed by Boyes et al. and Chazelle et al. assume an ever-expanding region of uncertainty around the aircraft; this region of uncertainty requires the system to perform a myriad of complicated calculations in order to determine pull up and other avoidance trajectories i.e. flight paths, to compensate for uncertainty in the height and other location data. The primary warning signal in the systems by Boyes et al and Chazelle et al. is a "pull up" command.

What is needed is a stand alone terrain conflict detector which generates a terrain display that accurately depicts obstacles along a projected flight path using a variety of display images including three dimensional (3D) images. Moreover, what is needed in a stand alone terrain conflict detector which generates an optimal, i.e., minimal, conflict avoidance vector whereby a minimal flight path correction along the corresponding avoidance vector can be made to avoid the obstacle. Furthermore, a stand alone terrain conflict detector simple enough for any licensed pilot to operate with minimal training would be extremely desirable, particularly when color is made one indicia of conflicts detected by the stand alone terrain conflict detector. What would be even more desirable is a stand alone terrain conflict detector which could be used in developing a flight plan. Advantageously, the most desirable package for the stand alone terrain conflict detector would be a portable device which could be carried onto the aircraft by one of the flight crew.

SUMMARY OF THE INVENTION

Based on the above and foregoing, it can be appreciated that there presently exists a need in the art for a stand alone terrain conflict detector which overcomes the above-described deficiencies. The present invention was motivated by a desire to overcome the drawbacks and shortcomings of the presently available technology, and thereby fulfill this need in the art.

One object of the present invention is to provide a stand-alone device that can be used in virtually any aircraft ranging from small aircraft, e.g., a hang glider or a Cessna, to large aircraft, e.g., a DC-3, MD-11, a Boeing 7X7 or an Airbus.

Another object according to the present invention is to provide a stand alone terrain conflict detector which determines the optimal, i.e., minimum, avoidance vector. Thus, the stand alone terrain conflict detector and corresponding method determined the safest escape route and display that route using 3D color graphics and a predictive flight path vector indicator.

Still another object according to the present invention is provide a stand alone terrain conflict detector which permits all information to be displayed to the flight crew by a selected one of a CRT display, a Map display or a Heads-up display.

Yet another object according to the present invention is to provide a stand alone terrain conflict detector requiring a relatively small training investment. According to one aspect of the present invention, the display output can be color-coded; the pilot advantageously can then be instructed to avoid areas annotated in a particular color. For example, the pilot could simply be warned not to fly toward areas marked in red ("DON'T FLY INTO RED OR YOU'RE DEAD") or warned to fly cautiously in the vicinity of obstacles depicted in yellow. It will be appreciated that training costs are a major deterrent to customers contemplating buying new technology.

Another object according to the present invention is to provide a stand alone terrain conflict detector having a flight path planning mode which provides the pilot with the capability to predict potential terrain conflicts prior to take-off.

These and other objects, features and advantages according to the present invention are provided by a stand alone terrain conflict detector of an aircraft having first, second, and third modes of operation. Preferably, the stand alone terrain conflict detector includes a global positioning system (GPS) receiver, a laser gyroscope, an accelerometer, a navigational database, a topographical database, a processor, a control panel operatively coupled to the processor for directing operation of the processor, and an obstacle detector, operatively coupled to the GPS receiver, the laser gyroscope, the accelerometer, the navigational database, the topographical database, and the processor, which obstacle detector, in cooperation with the processor, generates a first signal indicative of a flight plan, and generates at least one of a second signal signifying a terrain threat to the aircraft when an obstacle is located within a predetermined distance of a projected flight path vector of the aircraft and a third signal indicative of the projected flight path vector. Moreover, the stand alone terrain conflict detector also includes an audio generator which generates an distinctive audible signal responsive to the second signal, a video generator, operatively coupled to the obstacle detector, which generates a two dimensional (2D) image indicative of the flight path responsive to the first signal and data stored in the navigational database during the first mode of operation, which generates a first three dimensional (3D) image including the projected flight path vector responsive to the third signal and data stored in at least one of the navigational and topographical databases during the second mode of operation, and which automatically generates, whenever the audible signal is generated, a second 3D image, including an escape vector, having a scale different than that of the first 3D image responsive to the third signal and data stored in at least one of the navigational and topographical databases during the third mode of operation, and a display, electrically coupled to the video generator, which displays a respective one of the 2D image, the first 3D image and the second 3D image and the terrain threat.

According to one aspect of the present invention, the stand alone terrain conflict detector includes a 3D terrain database, which can be used to selectively replace a portion of at least one of the first and second 3D images. According to another aspect of the present invention, the navigational database and the topographical database are stored in a single memory.

These and other objects, features and advantages according to the present invention are provided by a stand alone terrain conflict detector of an aircraft having first through third modes of operation, including a global positioning system (GPS) receiver, a laser gyroscope, an accelerometer, a navigational database, a topographical database, a control panel, and a central processing unit (CPU), operatively coupled to the GPS receiver, the laser gyroscope, the accelerometer, the control panel, and the navigational database, which CPU generates position data, a flight path vector and control signals. Preferably, the stand alone terrain conflict detector also includes an obstacle detector operatively coupled to the CPU to receive the position data, the flight path vector responsive to the control signals, which generates a first signal indicative of a flight plan, and which generates at least one of a second signal identifying a terrain threat to the aircraft when an obstacle is located within a predetermined distance of a projected flight path vector of the aircraft and a third signal indicative of a projected flight path vector, an audio generator which generates an distinctive audible signal responsive to the second signal, a video generator, operatively coupled to the obstacle detector and the CPU, and a display, electrically coupled to the video generator, which displays a respective one of a two dimensional (2D) image, a first three dimensional (3D) image and a second 3D image and the terrain threat generated by video generator. Advantageously, the video generator generates the 2D image responsive to the first signal and data stored in the navigational database during the first mode of operation, generates the first 3D image including the projected flight path vector responsive to the third signal and data stored in at least one of the navigational and topographical databases during the second mode of operation, and automatically generates, whenever the audible signal is generated, the second 3D image, including an escape vector, having a scale different than that of the first 3D image responsive to the third signal and data stored in at least one of the navigational and topographical databases during the third mode of operation.

According to one aspect of the present invention, the control panel, the central processing unit (CPU), the audio generator, the video generator, and the display are disposed within a portable computer.

These and other objects, features and advantages according to the present invention are provided by a stand alone terrain conflict detector of an aircraft having first, second, and third modes of operation, includes:

a device for determining aircraft position from satellites;

a first device for determining the aircraft position inertially;

a second device for determining aircraft acceleration;

a third device for storing navigational data;

a fourth device for storing topographical data;

a processing device operatively coupled to the receiving device, and the first device, the second device and the third device for generating position data and a flight path vector;

a control device for controlling the processing device;

a detecting device operatively coupled to the CPU to receive the position data, the flight path vector responsive to the control signals provided by the control device, for generating a first signal indicative of a flight plan, and for generating at least one of a second signal identifying a terrain threat to the aircraft when an obstacle is located within a predetermined distance of a projected flight path vector of the aircraft and a third signal indicative of a projected flight path vector;

a first generating device for generating an distinctive audible signal responsive to the second signal;

a second generating device, operatively coupled to the detecting device and the processing device, for generating a two dimensional (2D) image responsive to the first signal and navigational data stored in the third device during the first mode of operation, for generating a first three dimensional (3D) image including the projected flight path vector responsive to the third signal and at least one of navigational data stored in the third device and topographical data stored in the fourth device during the second mode of operation, and which automatically generates, whenever the audible signal is generated, a second 3D image, including an escape vector, having a scale different than that of the first 3D image responsive to the third signal and at least one of navigational data stored in the third device and topographical data stored in the fourth device during the third mode of operation; and a display device, electrically coupled to the second generating device, for displaying a respective one of the 2D image, the first 3D image and the second 3D image and the terrain threat.

These and other objects, features and advantages according to the present invention are provided by an operating method for a stand alone terrain conflict detector of an aircraft, wherein the terrain conflict detector has a memory storing navigational data and topographical data and has first, second and third modes of operation. Preferably, the method includes steps for (a) determining a first aircraft position from satellites, (b) determining a second aircraft position inertially, (c) determining aircraft acceleration, (d) generating position data and a flight path vector responsive to control signals, at least one of the first and second aircraft positions, and the aircraft acceleration, (e) generating a first signal indicative of a flight plan, and generating at least one of a second signal identifying a terrain threat to the aircraft when an obstacle is located within a predetermined distance of a projected flight path vector of the aircraft and a third signal indicative of a projected flight path vector responsive to the position data, the flight path vector, and the control signals, (f) generating a distinctive audible signal responsive to the second signal, (g) generating a two dimensional (2D) image responsive to the first signal and the navigational data during the first mode of operation, (h) generating a first three dimensional (3D) image including the projected flight path vector responsive to the third signal and at least one of navigational data and topographical data during the second mode of operation, (i) automatically generating, whenever the audible signal is generated, a second 3D image, including an escape vector, having a scale different than that of the first 3D image responsive to the third signal and at least one of the navigational data and the topographical data during the third mode of operation, and (j) selectively displaying a respective one of the 2D image, the first 3D image and the second 3D image and the terrain threat.

These and other objects, features and advantages according to the present invention are provided by an operating method for a stand alone terrain conflict detector of an aircraft,

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which.

DETAILED DESCRIPTION OF THE PREFERRED EMBODIMENTS

Figure 1:
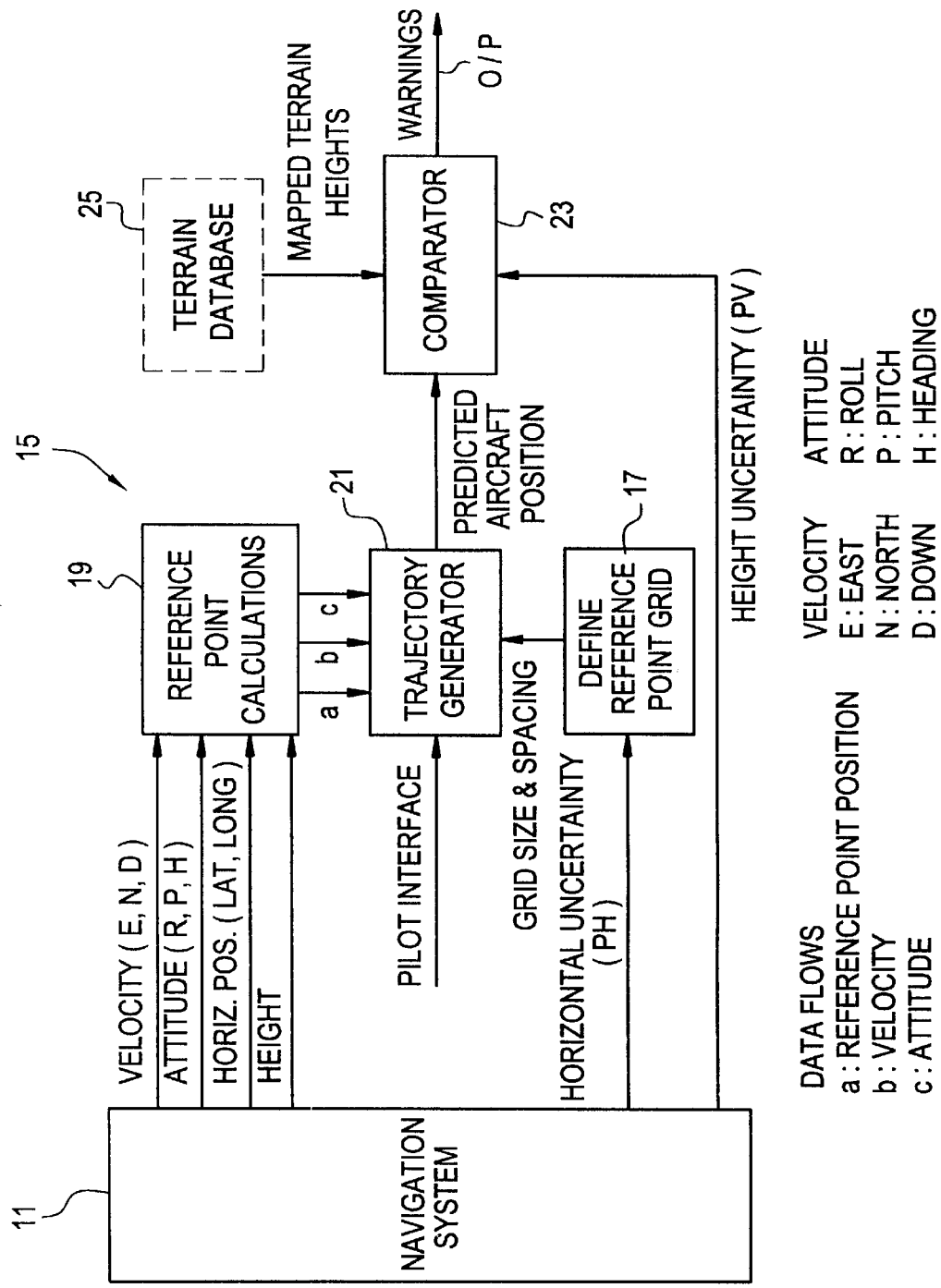
FIG. 1 is a high level block diagram of a conventional obstacle avoidance system.
Figure 2:
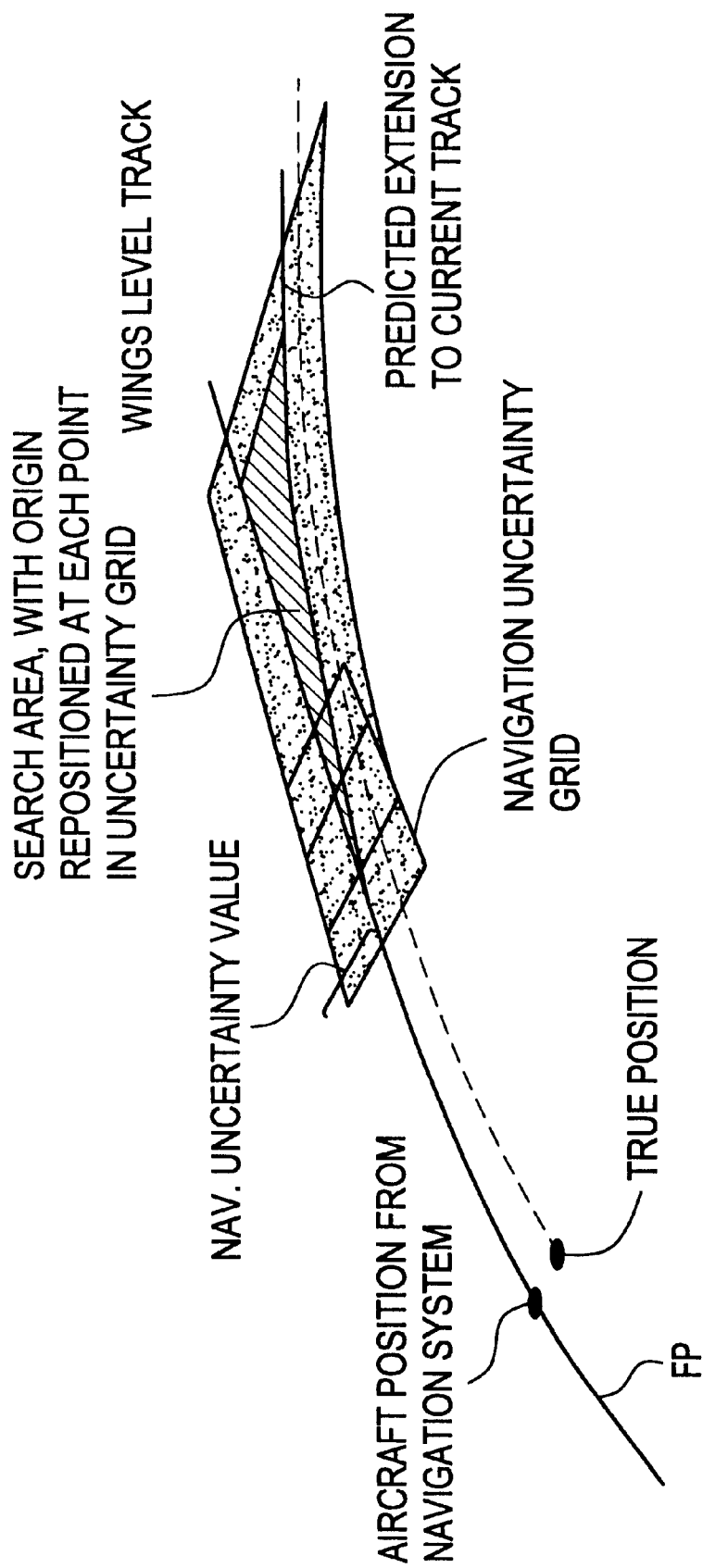
FIG. 2 is a schematic diagram which is useful in understanding the operation of the system depicted in FIG. 1.
Figure 3:
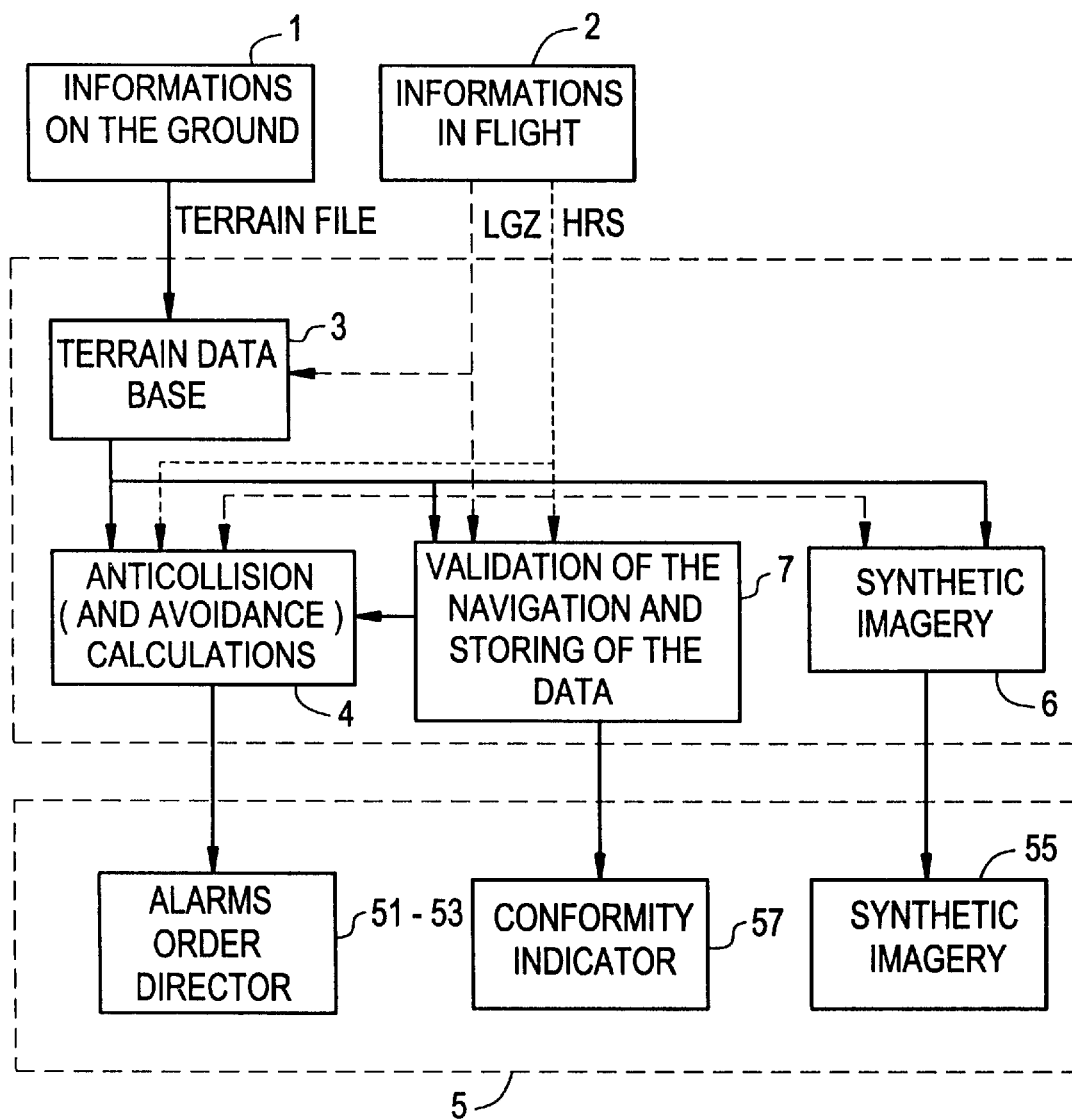
FIG. 3 is a high level block diagram of another convention collision avoidance system.
Figure 4:
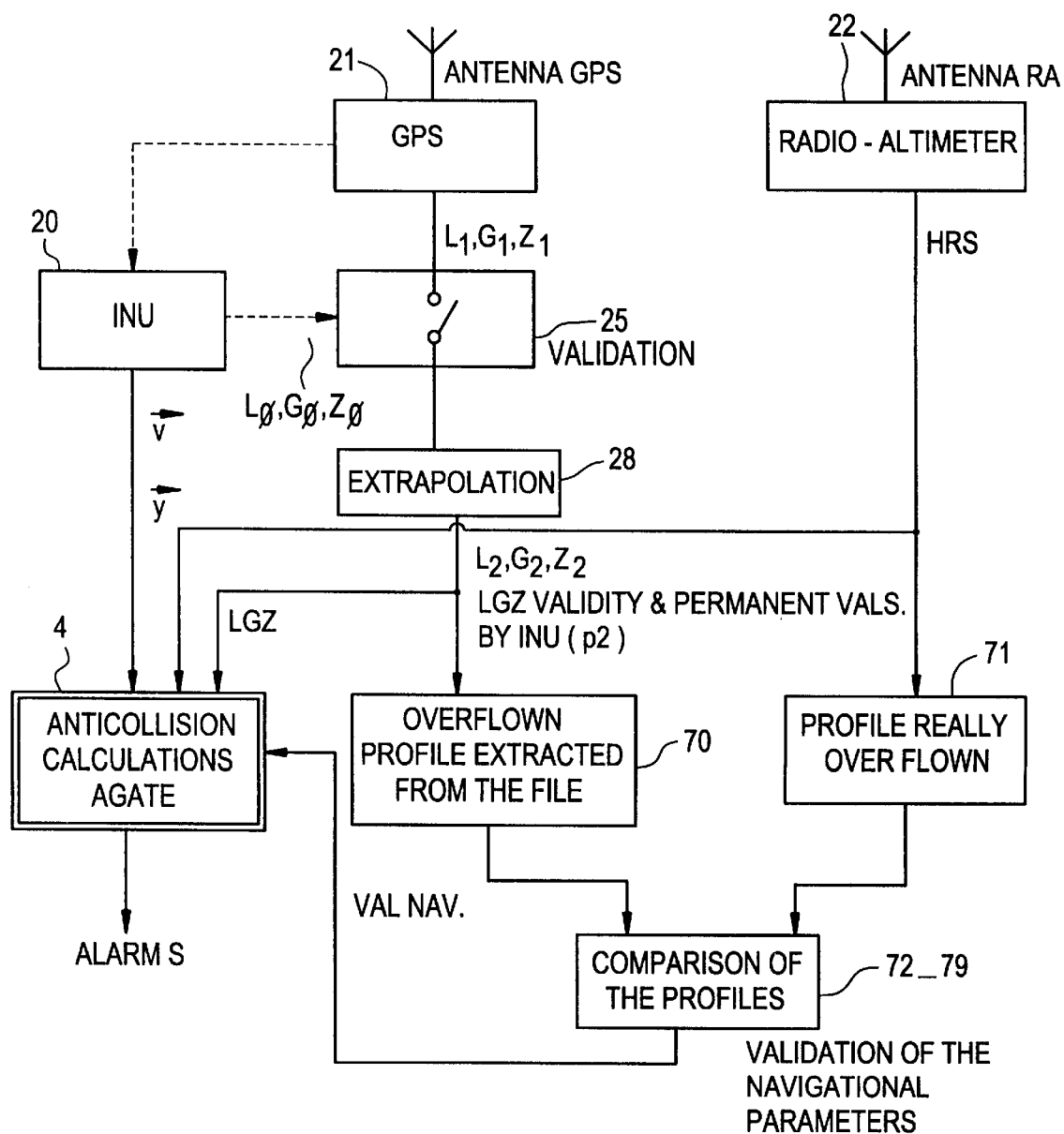
FIG. 4 is a block diagram provided a more detailed view of various elements illustrated in FIG. 3.
Figure 5:
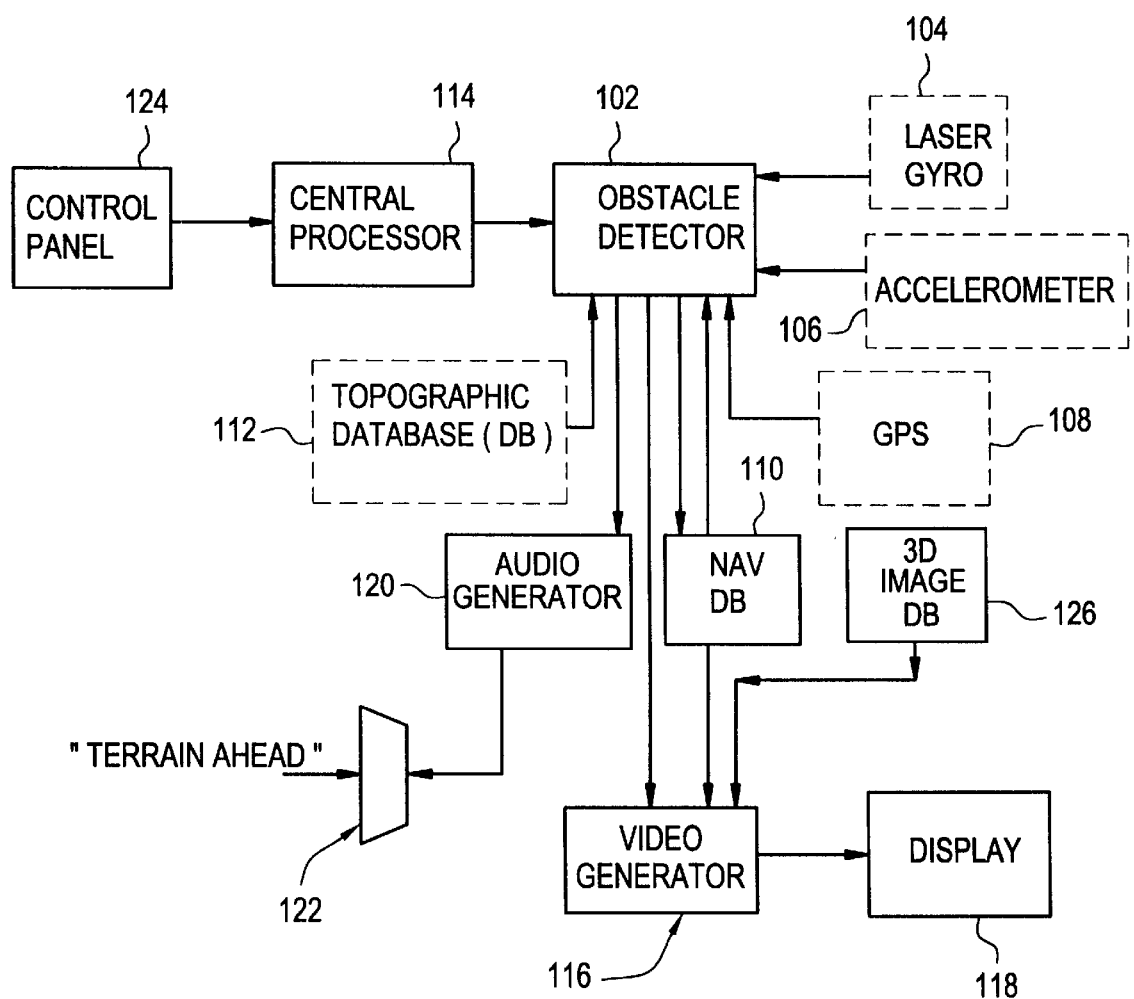
FIG. 5 is a high level block diagram of a stand alone terrain conflict detector according to a first preferred embodiment of the present invention.

The stand alone terrain conflict detector according to a first preferred embodiment of the present invention is illustrated in FIG. 5. Preferably, the stand alone terrain conflict detector includes an obstacle detector 102 receiving input and control signals from a laser gyroscope (hereinafter laser gyro) 104, an accelerometer 106, a global positioning satellite (GPS) receiver 108, a navigational data base 110, a topographical data base 112 and a central processor 114 operatively coupled to a control panel 124. Advantageously, the obstacle detector 102 generates graphical information which preferably is formatted in a video generator 116 for display on display device 118. In should be mentioned that the video generator need not be connected to a display device such as a liquid crystal display (LCD); the video generator 116 can be interfaced to other display mechanisms, e.g., a so-called heads-up display. In addition, the obstacle detector 102 provides several signals, which are discussed in greater detail below, to an audio generator 120, which provides various audible signals via a speaker 122.

Figure 6:
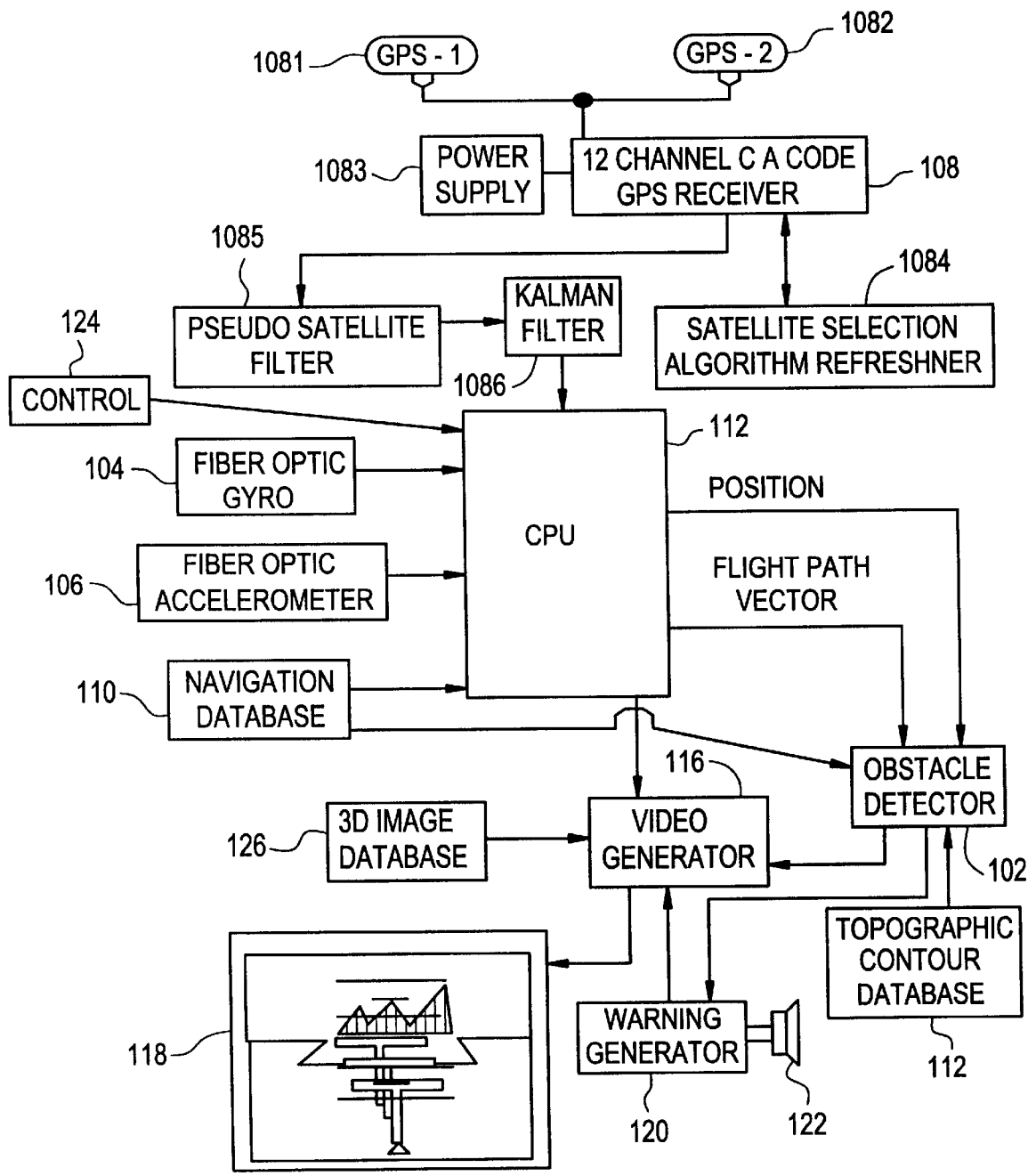
FIG. 6 is a high level block diagram of an alternative preferred embodiment of a stand alone terrain conflict detector according to the present invention, wherein discrete elements are connected to a portable computer.

An alternative preferred embodiment of the stand alone terrain conflict detector according to the present invention is illustrated in FIG. 6. It will be noted that the GPS receiver 108 of FIG. 6 is connected to antennas 1081 and 1082, a power supply 1083 and a satellite selection algorithm refresher 1084, as will be appreciated by one of ordinary skill in the art. Moreover, the output of GPS receiver 108 is provided to the CPU 114 via a pseudo satellite filter 1085 and a Kalman filter 1086, which devices are generally known and, thus, will not be discussed further. The other elements illustrated in FIG. 6 are substantially similar to those discussed above with respect to FIG. 5. It should be mentioned that the CPU 114, video generator 116, display 118, audio generator 120, speaker 122 and control panel advantageously can be provided in a portable or laptop computer. When a laptop computer is an integral part of the stand alone terrain conflict detector, the remaining components advantageously can be interfaced to the laptop computer through a serial port, through a parallel port or through a PCMCIA slot, the latter being preferred due to the high data transfer rate afforded by this type of peripheral connection.

It will be a appreciated that the stand alone terrain conflict detector according to the present invention, which combines existing technology in novel and non-obvious ways, provides a warning system which advantageously can provide pilots with detailed information on, and complete awareness of, approaching obstacles associated with the terrain or man-made obstacles. The existing technology preferably includes components such as:

1. An accurate map display. The GPS receiver 108 advantageously can be interfaced with, in an exemplary case, a laptop computer screen-sized dynamic map display, wherein the position output be the GPS receiver 108 is used to access the map, i.e., navigational data base 110, thus providing a map display 118 which is accurate to within feet nearly anywhere in the world. This is an important aspect of the present invention, since an accurate map is critical to situational awareness. Moreover, an accurate map is an essential element in determining a safe escape route, i.e., an escape vector. Preferably, the display 118, when operating in map mode (discussed in detail below) has a zoom capability from 1 to 300 nautical miles (nm).

2. A topographical data base 112. Once the moving map display of sufficient accuracy is provided, the navigation data base with the map display in the stand alone terrain conflict detector advantageously can be interfaced to an accurate topographical data base. It will be noted that the navigational and topographical databases, which are used in concert to provide an accurate 3D display of the terrain, are available in cartridge or CD format, and advantageously are updated periodically. It will also be appreciated that databases 110 and 112 advantageously can be stored using a single storage device, e.g., a CD-ROM.

3. A fiber-optic laser gyro 104.

4. An accelerometer 106. It will be appreciated that the fiber-optic laser gyro and accelerometer advantageously can be used cooperatively in an inertial navigation system to provide look ahead flight path vector information to predict, as well as depict, where the airplane will be in one minute intervals. This information is displayed on the display 118.

5. Obstacle detector 102. The stand alone terrain conflict detector includes an obstacle detector which compares current position data for the aircraft with portions of the topographical database 112 corresponding to the current position data and generates signals for activation of an aural warning system, audio generator 120 and speaker 122, to warn pilots of approaching naturally occurring or man-made obstacles in the terrain.

Figure 7:
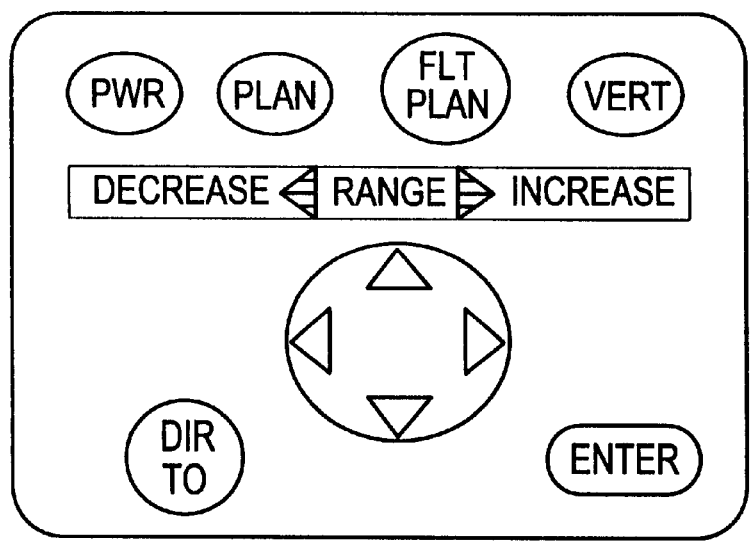
FIG. 7 illustrates an exemplary control panel configuration which can be used with the stand alone terrain conflict detectors illustrated in FIGS. 5 and 6.

FIG. 7 illustrates an exemplary control panel 124 which advantageously can be used with either of the stand alone terrain conflict detectors depicted in FIGS. 5 and 6. As illustrated in FIG. 7, the control panel 124 consists of an on-off switch, mode select buttons for the PLAN, FIT PLAN and VERT modes, a zoom control, a cursor control, a direct intercept switch, and an ENTER button.

It will appreciated that the control panel 124 advantageously can be a virtual control panel, which, in an exemplary case, can be toggled ON and OFF by activation of a function key included with the laptop computer. Moreover, operation of the "Vert" button on the control panel advantageously can toggle the button between "Vert" and "Range" labels while the center of the horizontal bar toggles between "range" and "Vert," respectively. Of course, other control panel configurations will occur to one of ordinary skill in the art and all such variations are considered to be within the scope of the present invention. It will be appreciated that the essential design principle with respect to the control panel is that the control panel cannot be so complex that is degrades the pilot's situational awareness, i.e., it cannot distract the pilot from flying his/her aircraft.

A more detailed discussion of the operation and interaction of selected components of the stand alone terrain conflict detector will now be present while referring to FIGS. 5, 6, and 8a–8f. It will be appreciated that components in the signal path between, for example, the GPS receiver 108 and the display 118 may be omitted from FIGS. 8a–8f so as not to obscure the operation of and the interaction of selected components.

Figure 8A:
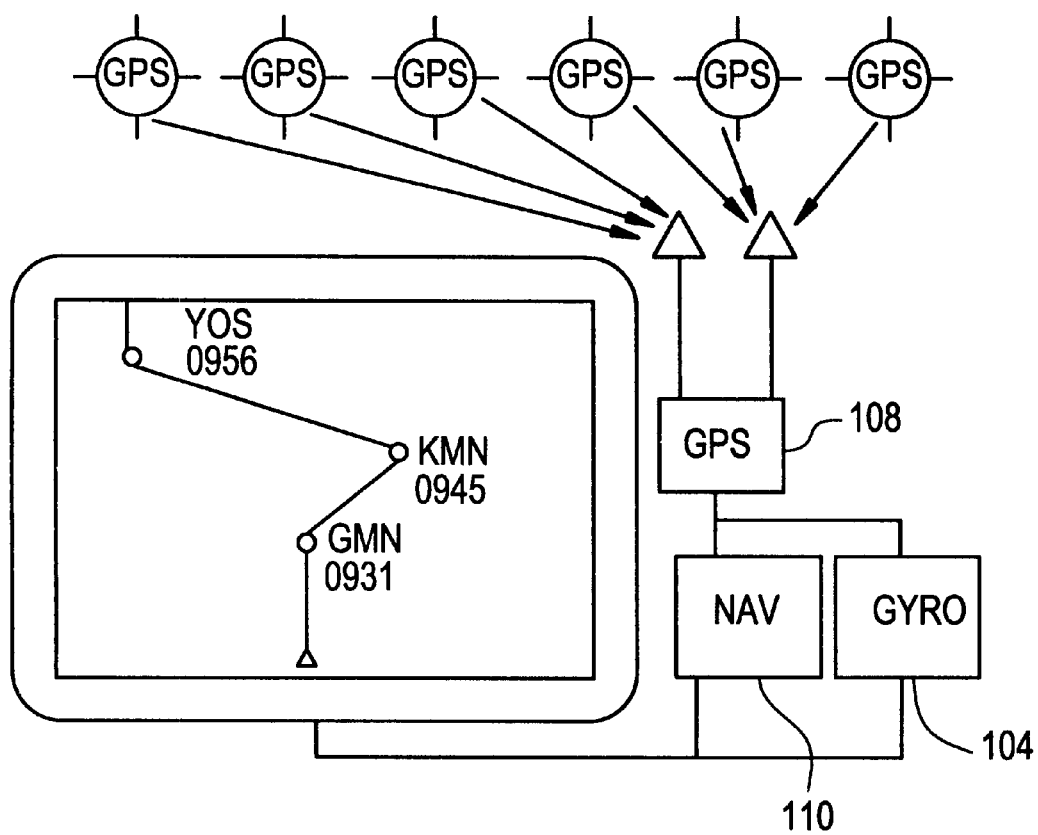
FIGS. 8a–8f are illustrations which are useful in understanding the operation of the stand alone terrain conflict detector according to the present invention.
Figure 8B:
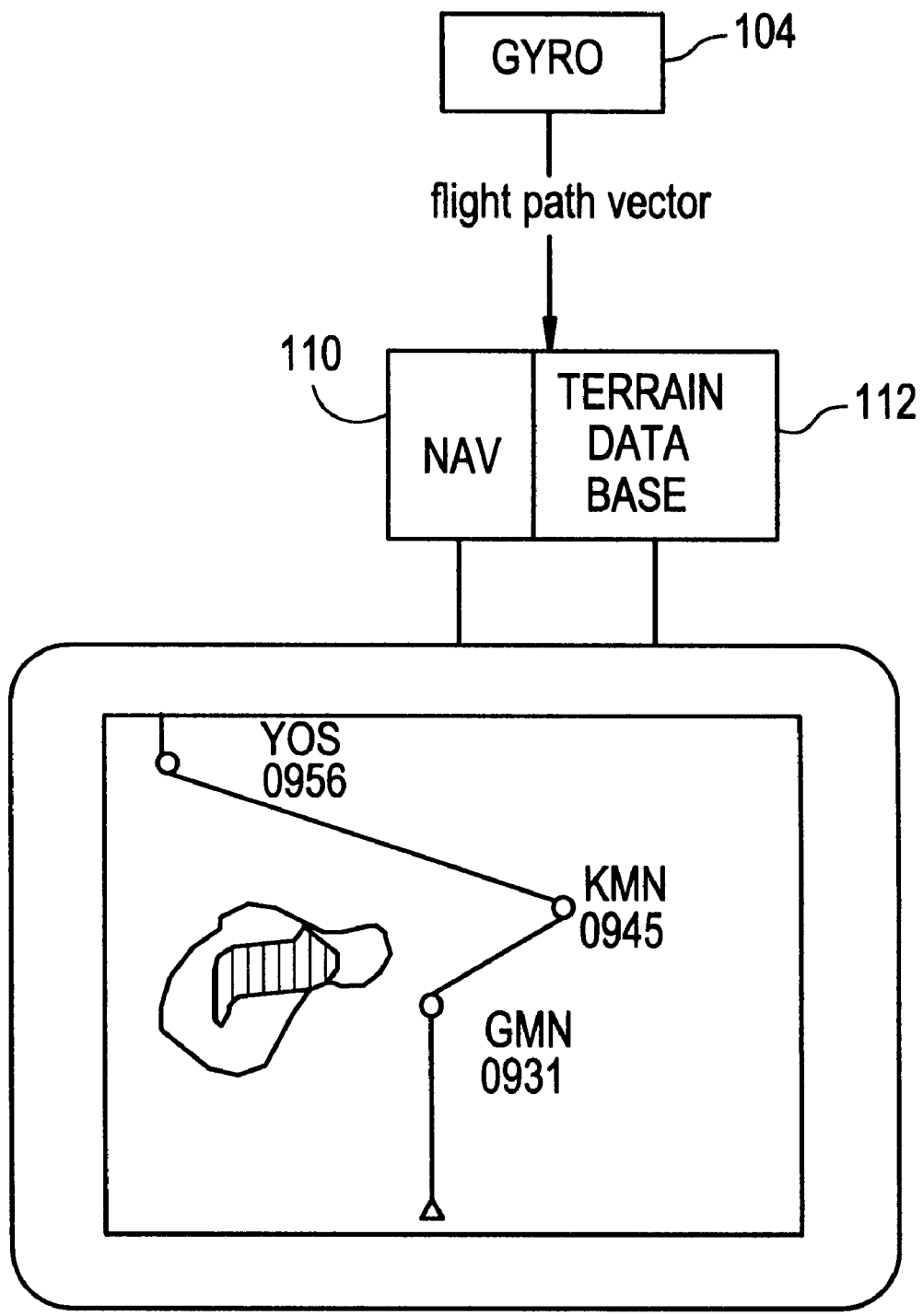

Using 3D graphics, the stand alone terrain conflict detector according to the present invention advantageously can display terrain in such a manner that pilots can readily see where the terrain or obstacle is relative to the aircraft, and easily be able to determine one or more escape routes. For example, as illustrated in FIG. 8a, the GPS receiver 108 is used to constantly update the map display 118 so that the map is accurate to within several feet. It will be appreciated that the fiber optic laser gyro 104 inertially updates the map and aircraft position any time the GPS signal is lost by the GPS receiver 108 due to antenna blocking, during turns, etc. Moreover, as illustrated in FIG. 8b, the global contour topographical data base 112 can be integrated with the navigation database 110. Interfacing the topographical database 112 with the map display 118, the fiber optic laser gyro 104 and accelerometer 106 permits display of a hazardous obstacle in a distinctive manner. In other words, any time the predicted flight path vector indicates that the aircraft will approach or collide with terrain or a man-made obstacle, that terrain or obstacle will be indicated on the map as a red obstacle, or as crosshatched red obstacle, i.e., by some distinctive visual warning indication. Thus, the pilot can accurately see terrain or obstacles in any weather or lighting conditions.

Figure 8C:
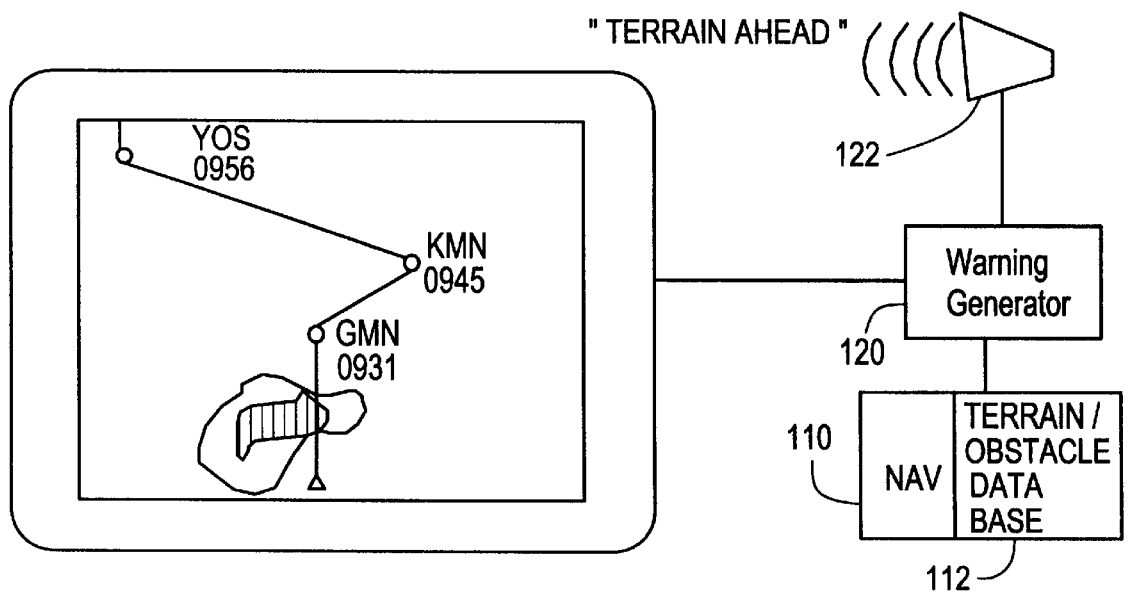
Figure 8D:
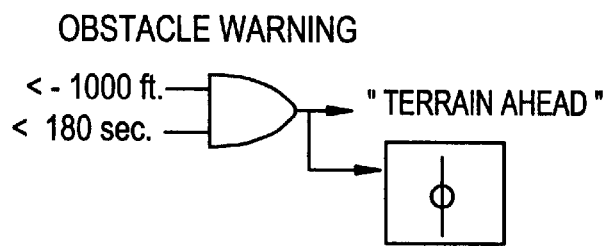
Figure 8E:
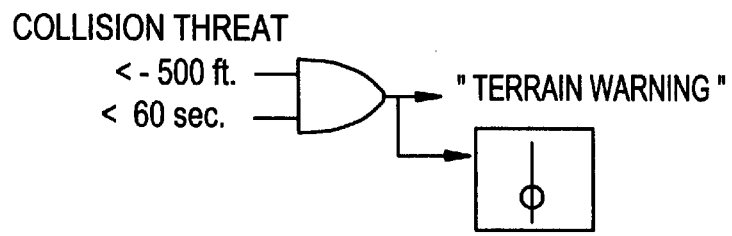
Figure 8F:
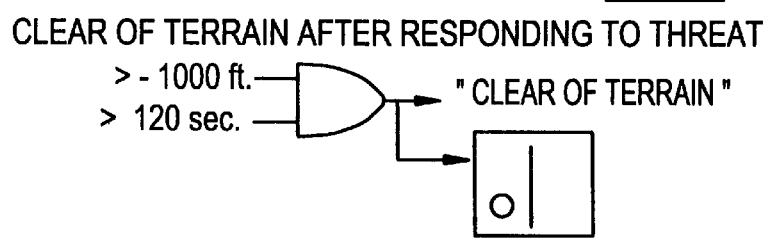

Advantageously, the pilot is provided with a look-ahead terrain warning capability, as illustrated in FIG. 8c. It will be appreciated that this look-ahead subsystem differs substantially from a conventional ground proximity warning systems (GPWS). The look-ahead terrain warning subsystem searches for intersections, or close approaches, between projections of the flight path vector and known obstacles in the navigational database 110. As shown in FIGS. 8d–8f, several levels of warning are possible with the stand alone terrain conflict detector illustrated in FIGS. 5 and 6. Most specifically, the obstacle detector 102 is looking several minutes down the projected flight path vector. In contrast, the prior art obstacle avoidance systems are just in time systems, i.e., warnings are provided at what the system designer considers to the edge of the safe air space. In a recent CFIT event in Columbia, the "TERRAIN" GPWS warning sounded approximately 9 seconds before the aircraft hit; this is hardly enough time for the flight crew to react, much less make the aircraft respond in an emergency pull-up maneuver. The stand alone terrain conflict detector according to the present invention avoids the need for instant response and sudden maneuvers by increasing the situational awareness of the flight crew using easily interpreted visual cues.

It will be appreciated that once the pilot is warned of an approaching terrain obstacle, the "escape route" is readily apparent on the map. Moreover, given enough look-ahead capability, when the terrain warning sounds the pilot advantageously can execute a normal climb or turn instead of initiating violent or radical evasive action. Thus, the key to the stand alone terrain conflict detector is to provide an accurate look-ahead capability needed to detect approaching obstacles. It will be appreciated that this look-ahead capability requires GPS position input. Stated another way, the stand alone terrain conflict detector employs flight path vector information to search the navigation database and, advantageously, the topographical database, for approaching hazardous terrain or obstacles. When the obstacle detector 102 detects a terrain collision threat ahead, it sends a TERRAIN AHEAD warning in adequate time so the pilot can see where the terrain is, decide the best course of action, then take evasive action without having to resort to violent maneuvering.

Thus, the obstacle detector gathers input from he GPS receiver 108, the fiber optic laser gyro 104, the accelerometer 106, the navigation database 110 and the topographic database 112 to determine present position, flight path vector, and any terrain or obstacle that is a threat. Any terrain or obstacle that is considered a threat is translated into audio outputs to audibly warn the pilot of the threat. At the same time, video outputs depicting the identified threat are generated and displayed on the map display 118.

Figure 9A:
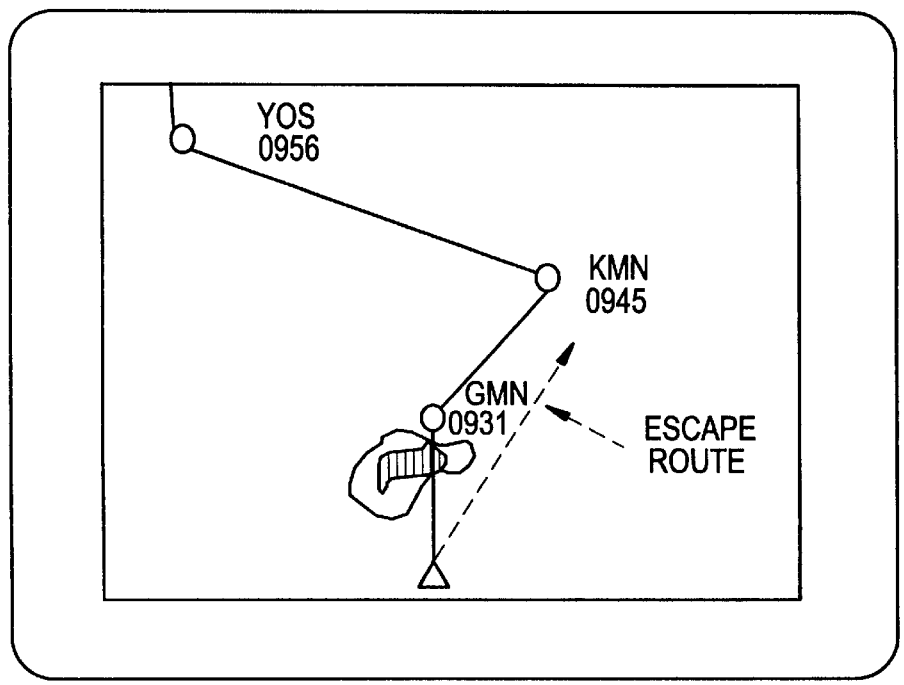
FIGS. 9a–9j illustrate various forms by which the information generated by the stand alone terrain conflict detector according to the present invention can be displayed.
Figure 9B:
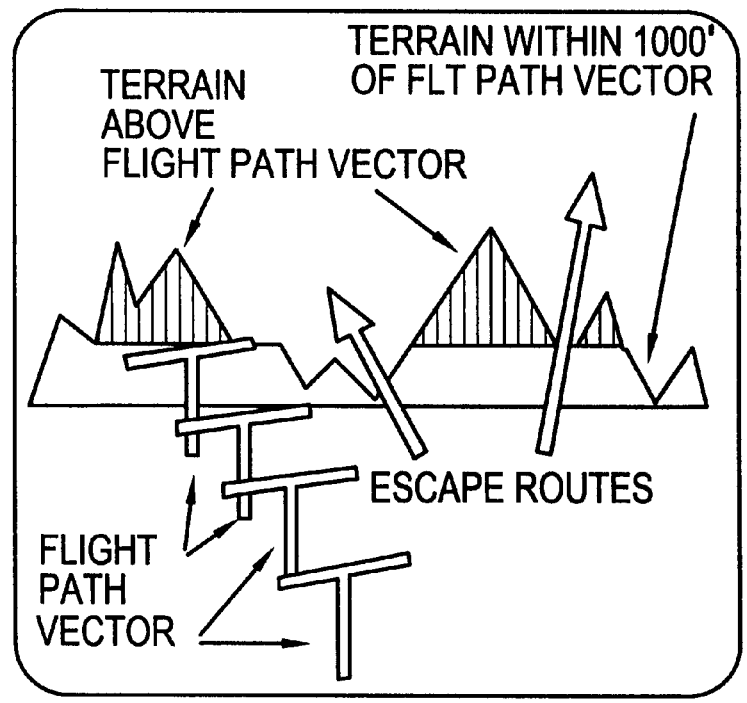
Figure 9C:
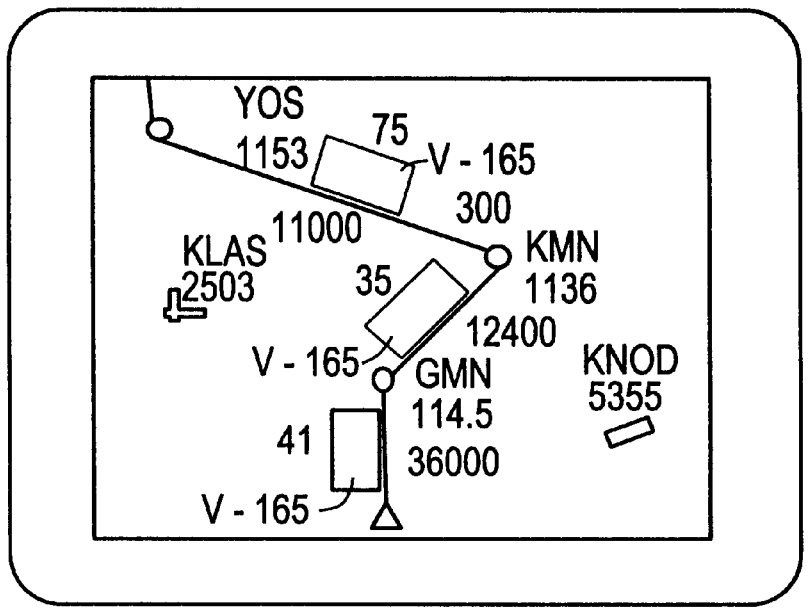
Figure 9D:
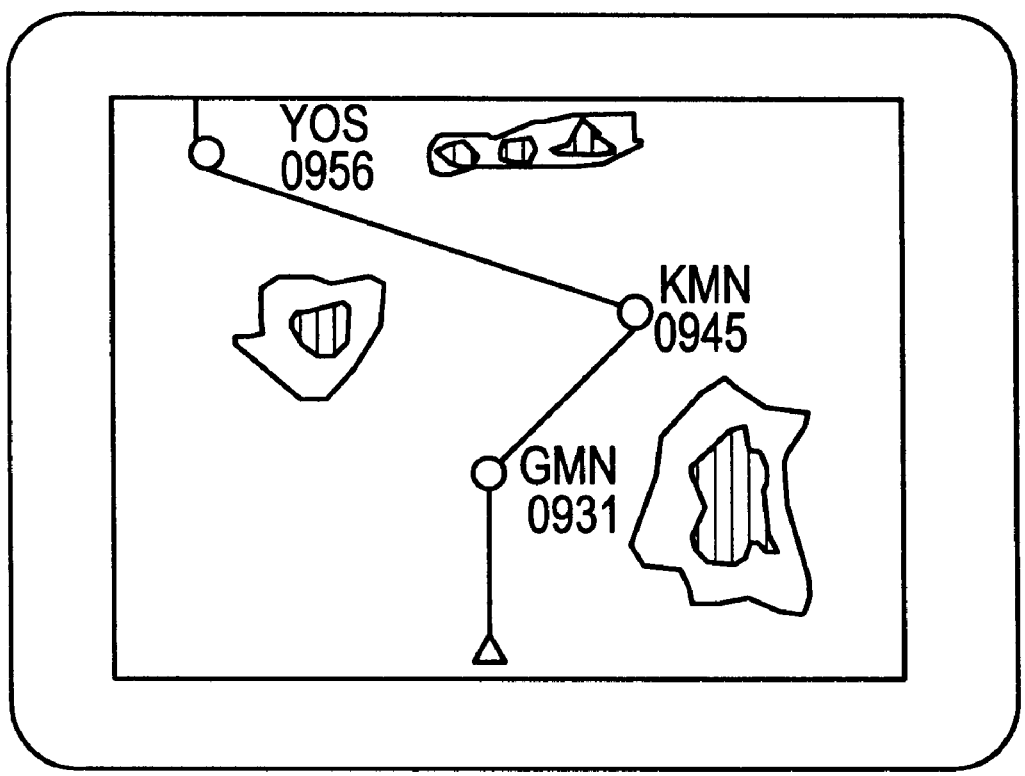
Figure 9E:
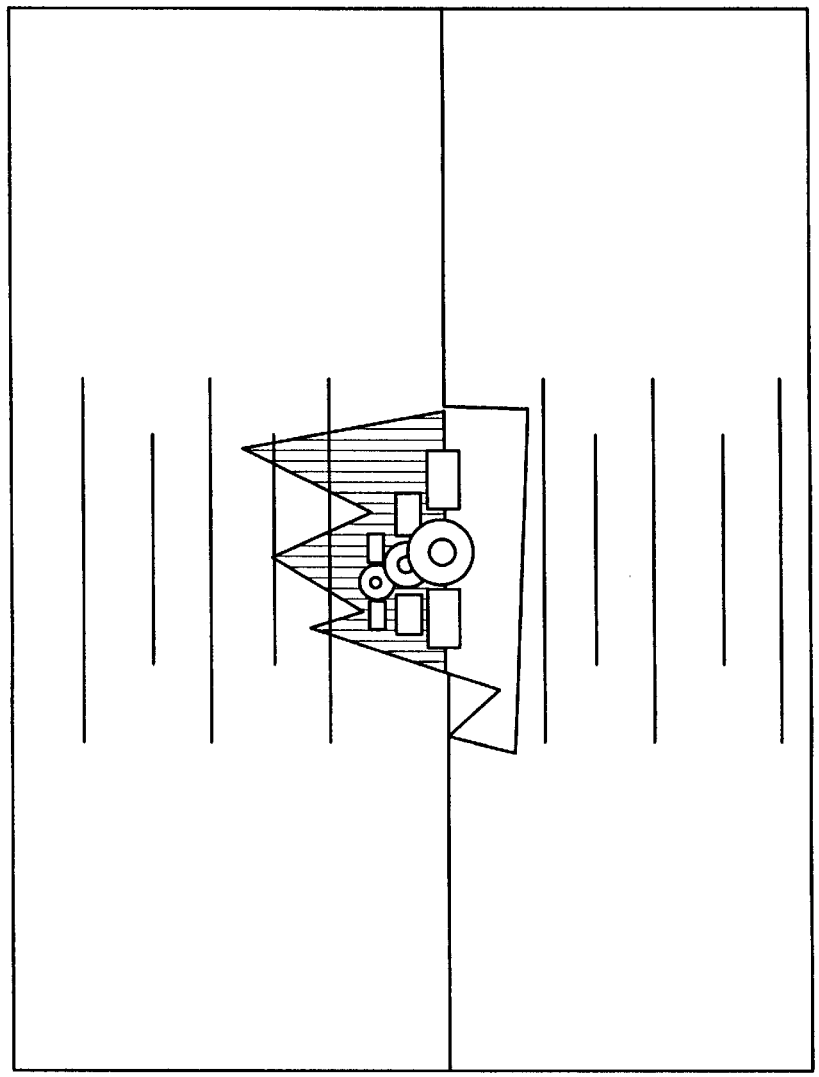
Figure 9F:
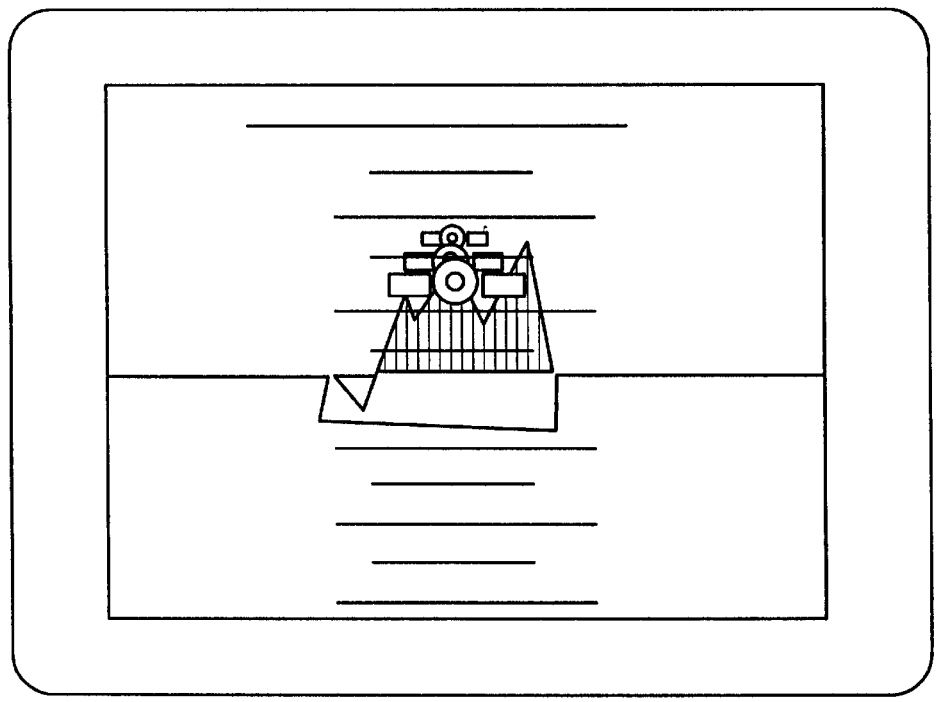
Figure 9G:
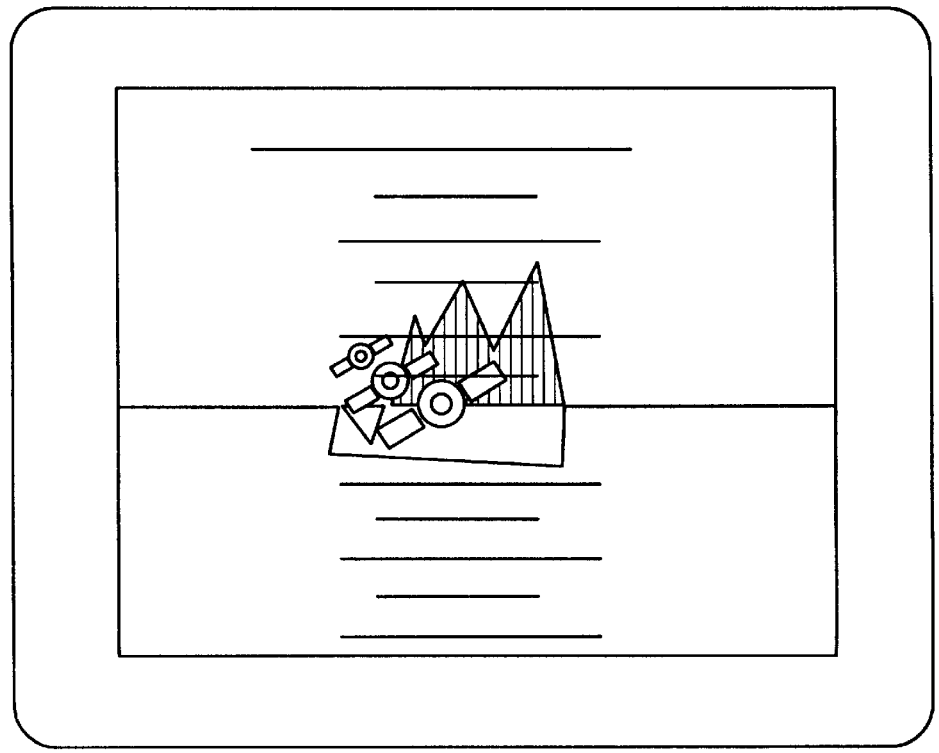
Figure 9H:
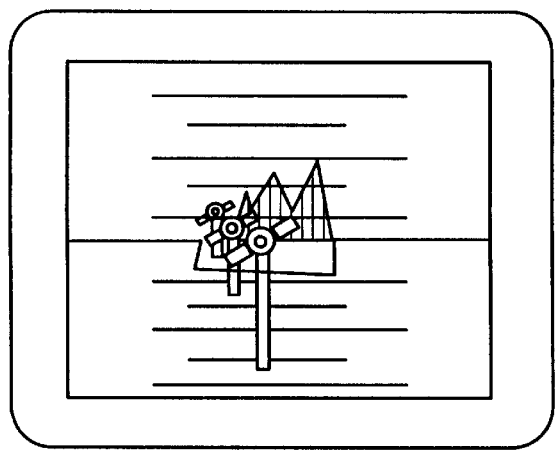

It will be appreciated that the display 118 advantageously can provide several different depictions of the terrain surrounding the aircraft or the terrain ahead of the aircraft along the flight path vector. For example, FIG. 9a is an illustration of a two dimensional (2D) map, FIG. 9b illustrates the terrain that will be encountered along the current fligh path vector, and FIG. 9c illustrates a conventional 2D air space chart. It will be appreciated that the terrain appearing in the 3D graphics Look Ahead Mode appears just as if the pilot were looking out the front window of the aircraft at the terrain. The high points are obvious, as are terrain features and best escape routes. Advantageously, distinctive color coding or annotation can be employed to assist the pilot in maintaining situational awareness. For example, all portions of the terrain or obstacles above the current altitude of the aircraft could be displayed in red while all terrain below but within 1000 feet of the aircraft's altitude could be displayed in yellow. It will be appreciated that the terrain is clearly visible in the 3D graphics mode, irrespective of the actual visibility from the aircraft. Thus, the pilot advantageously can "see" the terrain on the display screen at all times.

Moreover, as discussed above, the operator can select several graphic displays to portray airplane position and flight path vector. More specifically, the so-called Map Mode illustrated in FIG. 9a displays aeronautical chart information with airways, airports, radio navigation aids, special use airspace, minimum enroute altitudes, spot elevations and flight plan information clearly depicted. It will be appreciated that this display mode advantageously can be employed during flight planning. In contrast, the Flight Plan Mode displays flight plan information such as navigation aids which will be used for the entered flight plan, nearest alternative airports, intended flight path vector, progress information and terrain display so that the pilot can verify his/her flight plan. See FIG. 9c.

During the actual flight, Look Ahead Mode is employed to provide a straight ahead view as if you are looking out the cockpit window. See FIG. 9b. The display 118 preferably displays the horizon, the vertical flight path vector, terrain and obstacle height information, and pitch reference lines. It will be appreciated that any time there is a terrain threat or warning, the stand alone terrain conflict detector switches to this mode of operation and adjusts the screen size to accommodate a five minute look-ahead view. This mode of operation beneficially allows the pilot to determine if the obstacle can be overflown or flown around. Once the pilot ascertains the nature of the threat and formulates a plan to avoid it, the stand alone terrain conflict detector operates in Escape Maneuver Mode. The pilot simply maneuvers the airplane so that the projected flight path vector either goes over or around the obstacle.

Figure 9I:
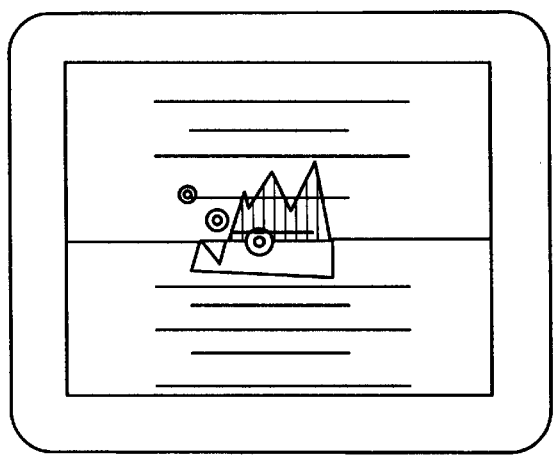
Figure 9J:
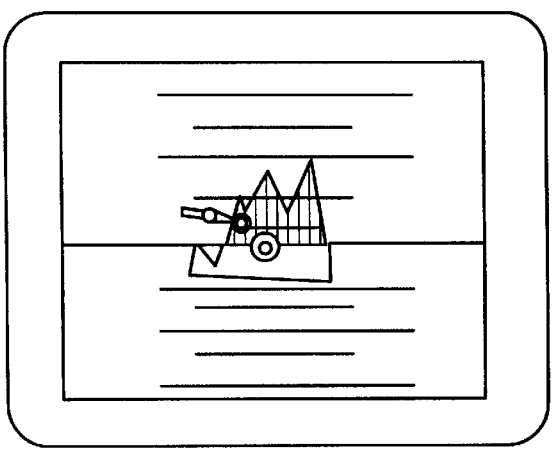

It should be noted that there are several different ways to clearly depict the minute-by-minute projection of the flight path vector. For example, the flight path vector is displayed in FIGS. 9b, and 9e–9h as a series of "telephone poles" that show the predicted position and altitude at one minute intervals up to, in an exemplary case, four minutes. It will be noted that if the aircraft is in a turn, the horizontal part of the "telephone pole" is banked to match the actual degree of bank of the aircraft. It will also be noted that there are many ways to depict the flight path vector. For example, FIGS. 9e–9h employ a "Telephone Pole" depiction. Another way is the "funnel" depiction, where decreasing size boxes show the pilot where he/she will be at every future minute along the flight path vector. See FIG. 9i. A still further way is the "Snake" depiction, where a single line depicts the vector, as illustrated in FIG. 9j. It will be appreciated that the various depiction schemes may be selectively combined with one another. Moreover, other depiction schemes will occur to one of ordinary skill in the art; these alternative displays are considered to be within the scope of the present invention.

Figure 10A:
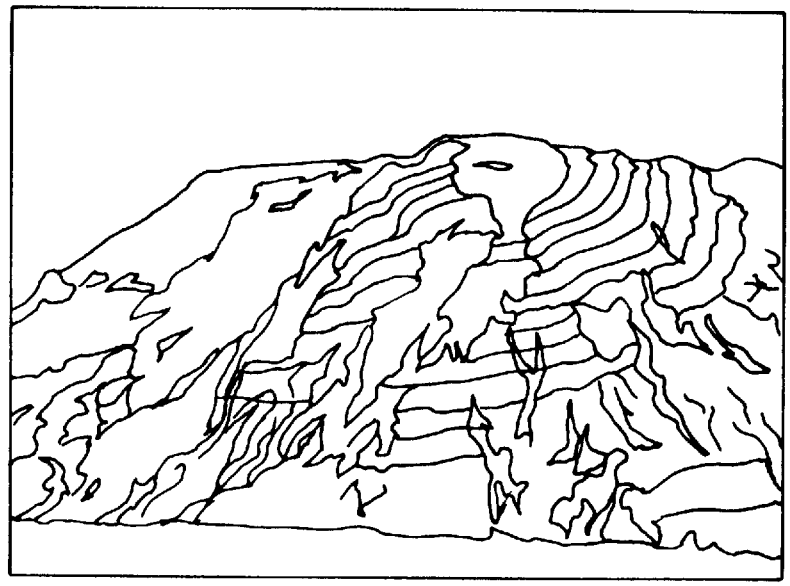
FIGS. 10a–10b illustrate the three dimension (3D) pictorial display generated by combination of navigation and topographic data base information by the stand alone terrain conflict detector of the present invention.
Figure 10B:
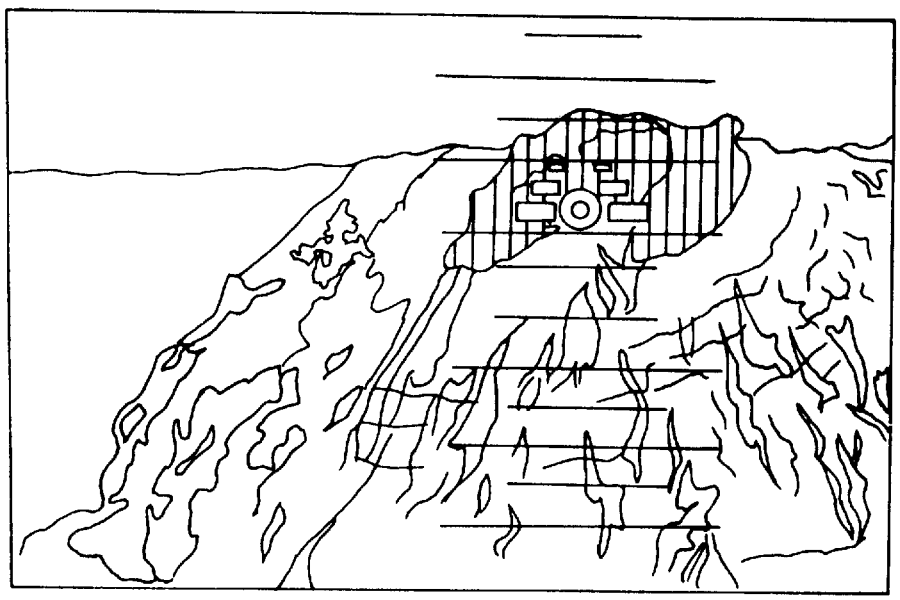

Advantageously, the stand alone terrain conflict detector according to the present invention provides the capability of displaying 3D images extracted from an accurate 3D terrain database 126, as shown in FIG. 6. For example, an image of Mt. St. Helens produced by Infotec Delta 3D Images is illustrated in FIGS. 10a and 10b. It will be appreciated that relevant portions of the topographical database 112 can, in an exemplary case, be replaced by properly scaled and oriented 3D images from the 3D terrain database. It will also be appreciated that the 3D image is scaled and rotated as needed so that the 3D image the pilot sees is the image corresponding to the aircraft's current position as determined by GPS receiver 108.

It should be mentioned that the stand alone terrain conflict detector according to the present invention is not a primary flight instrument for controlling the aircraft. The main function of the stand alone terrain conflict detector is to aid in preventing Controlled Flight Into Terrain (CFIT) accidents. In order for this invention to be effective, the pilot must be able to look at the screen after a terrain alert or warning, and quickly determine what course of action to take, e.g., climb, turn, reverse course, etc. By using the universal warning color red to depict terrain or man-made obstacles that are at or above the flight path vector, the pilot can immediately see what flight path vector is needed to avoid the threat. By using the universal caution color (yellow) to depict terrain or obstacles that are between 1 and 1000 feet below the flight path vector, the pilot can see at a glance that there are terrain or obstacles below.

It will be appreciated that the training required to familiarize the pilot with the use of the stand alone terrain conflict detector is minimal. The instructor simply explains what the flight path vector means, and how to change it by climbing, descending or turning. When the display 118 is a color display, an additional warning to the pilot such as "DON'T FLY INTO THE RED OR YOU ARE DEAD!" will suffice to complete the training.

It should be mentioned that the discrete elements used in fabricating the stand alone terrain conflict detector are, for the most part, commercial off the shelf (COTS) devices. For example, GPS receivers having the required accuracy are available from numerous manufacturers. Most of the available GPS receivers can be provided with Jeppeson aviation databases. In addition, fiber optic laser gyros and accelerometers are commercially available. Litton Industries produces fiber optic laser gyros about the size of a quarter and fiber optic accelerometers about the size of a dime. The U.S. Military is also attempting to find civilian uses for their fiber optic gyros. With respect to the topographical database, Infotec offers such as database as part of its Delta 3D Images program. Moreover, government agencies, e.g., the Defense Mapping Agency, have developed very accurate global topographic data bases.

From the discussion above, it will be appreciated that the stand alone terrain conflict detector according to the present invention has applicability for all aircraft from a home built hobby plane to a large jetliner. It should be mentioned that the stand alone terrain conflict detector would cost less to install on a modern state-of-the-art airplane because some of the airplane's systems could be used instead of the relatively expensive parts illustrated in FIGS. 5 and 6. For instance, if the airplane has a glass cockpit, Global Position Satellite (GPS), Inertial Reference System (IRS), Ground Proximity Warning System (GPWS) and a Flight Management System (FMS), then the invention could be installed without a Navigation Data Base, GPS, Fiber Optic Laser Gyro, Accelerometer, audio and video generators, video screen and speaker. The invention would use inputs from the aircraft's GPS, IRS, GPWS and other systems to determine position and flight path vector. The output of the terrain conflict detector would be applied to the GPWS and map display Symbol Generator. It will be appreciated that when the airplane is equipped with a heads-up display, terrain information advantageously can be displayed on the heads-up display as well as the map display.

In summary, the stand alone terrain conflict detector according to the present invention provides a more precise and realistic indication of the terrain obstacles using 3D color graphics. Moreover, the present invention advantageously provides an earlier warning than those provided by the above-described prior art devices. In addition, the stand alone terrain conflict detector according to the present invention provides lateral and vertical escape guidance by use of the predictive flight path vector indicator. Knowing where an obstacle is located is not enough, the pilot needs to know if the airplane is capable of flying over the obstacle or if there is a path to fly around it.

Although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A stand alone terrain conflict detector of an aircraft having first, second, and third modes of operation, comprising:

a global positioning system (GPS) receiver;

a laser gyroscope;

an accelerometer;

a navigational database;

a topographical database;

a processor;

a control panel operatively coupled to said processor for directing operation of said processor;

an obstacle detector, operatively coupled to said GPS receiver, said laser gyroscope, said accelerometer, said navigational database, said topographical database, and said processor, which obstacle detector, in cooperation with said processor, generates a first signal indicative of a flight plan, and generates at least one of a second signal signifying a terrain threat to the aircraft when an obstacle is located within a predetermined distance of a projected flight path vector of the aircraft and a third signal indicative of the projected flight path vector;

an audio generator which generates an distinctive audible signal responsive to said second signal;

a video generator, operatively coupled to said obstacle detector, which generates a two dimensional (2D) image indicative of the flight path responsive to said first signal and data stored in said navigational database during the first mode of operation, which generates a first three dimensional (3D) image including the projected flight path vector responsive to said third signal and data stored in at least one of said navigational and topographical databases during the second mode of operation, and which automatically generates, whenever said audible signal is generated, a second 3D image, including an escape vector, having a scale different than that of said first 3D image responsive to said third signal and data stored in at least one of said navigational and topographical databases during the third mode of operation; and a display, electrically coupled to said video generator, which displays a respective one of said 2D image, said first 3D image and said second 3D image and said terrain threat.

2. The stand alone terrain conflict detector as recited in claim 1, further comprising a 3D terrain database, wherein a selected portion of at least one of said first and second 3D images is replaced by a corresponding 3D terrain image stored in said 3D terrain database.

3. The stand alone terrain conflict detector as recited in claim 1, wherein said navigational database and said topographical database are stored in a single means for storing.

4. A stand alone terrain conflict detector of an aircraft having first through third modes of operation, comprising:
- a global positioning system (GPS) receiver;
- a laser gyroscope;
- an accelerometer;
- a navigational database;
- a topographical database;
- a control panel;
- a central processing unit (CPU), operatively coupled to said GPS receiver, said laser gyroscope, said accelerometer, said control panel, and said navigational database, which CPU generates position data, a flight path vector and control signals;
- an obstacle detector operatively coupled to said CPU to receive said position data, said flight path vector responsive to said control signals, which generates a first signal indicative of a flight plan, and which generates at least one of a second signal identifying a terrain threat to the aircraft when an obstacle is located within a predetermined distance of a projected flight path vector of the aircraft and a third signal indicative of a projected flight path vector;
- an audio generator which generates an distinctive audible signal responsive to said second signal;
- a video generator, operatively coupled to said obstacle detector and said CPU, which generates a two dimensional (2D) image responsive to said first signal and data stored in said navigational database during the first mode of operation, which generates a first three dimensional (3D) image including the projected flight path vector responsive to said third signal and data stored in at least one of said navigational and topographical databases during the second mode of operation, and which automatically generates, whenever said audible signal is generated, a second 3D image, including an escape vector, having a scale different than that of said first 3D image responsive to said third signal and data stored in at least one of said navigational and topographical databases during the third mode of operation; and
- a display, electrically coupled to said video generator, which displays a respective one of said 2D image, said first 3D image and said second 3D image and said terrain threat.

5. The stand alone terrain conflict detector as recited in claim 4, further comprising a 3D terrain database, wherein a selected portion of at least one of said first and second 3D images is replaced by a corresponding 3D terrain image stored in said 3D terrain database.

6. The stand alone terrain conflict detector as recited in claim 4, wherein said navigational database and said topographical database are stored in a single means for storing.

7. The stand alone terrain conflict detector as recited in claim 4, wherein said control panel comprises a virtual control panel manifest on said display.

8. The stand alone terrain conflict detector as recited in claim 4, wherein said escape vector displayed in the third mode of operation corresponds to the projected flight path vector displayed in the second mode of operation, wherein maneuvers of the aircraft are reflected in said escape vector, and wherein the distal end of said escape vector terminates in a section of said second 3D image to thereby permit a pilot to determine whether or not said maneuver will cause the aircraft to avoid said terrain threat.

9. The stand alone terrain conflict detector as recited in claim 4, wherein said control panel, said central processing unit (CPU), said audio generator, said video generator, and said display are disposed within a portable computer.

10. The stand alone terrain conflict detector as recited in claim 4, further comprising a laptop computer housing said central processing unit (CPU), said audio generator, said video generator, and said display, wherein said laptop computer includes a compact disk read only memory (CD-ROM) which stores said navigational database, and wherein said control panel comprises a virtual control panel displayed on said display.

11. A stand alone terrain conflict detector of an aircraft having first, second, and third modes of operation, comprising:
- receiving means for determining aircraft position from satellites;
- first means for determining said aircraft position inertially;
- second means for determining aircraft acceleration;
- third means for storing navigational data;
- fourth means for storing topographical data;
- processing means operatively coupled to said receiving means, and said first means, said second means and said third means for generating position data and a flight path vector;
- control means for controlling said processing means;
- detecting means operatively coupled to said CPU to receive said position data, said flight path vector responsive to said control signals provided by said control means, for generating a first signal indicative of a flight plan, and for generating at least one of a second signal identifying a terrain threat to the aircraft when an obstacle is located within a predetermined distance of a projected flight path vector of the aircraft and a third signal indicative of a projected flight path vector;
- first generating means for generating an distinctive audible signal responsive to said second signal;
- second generating means, operatively coupled to said detecting means and said processing means, for generating a two dimensional (2D) image responsive to said first signal and navigational data stored in said third means during the first mode of operation, for generating a first three dimensional (3D) image including the projected flight path vector responsive to said third signal and at least one of navigational data stored in said third means and topographical data stored in said fourth means during the second mode of operation, and which automatically generates, whenever said audible signal is generated, a second 3D image, including an escape vector, having a scale different than that of said first 3D image responsive to said third signal and at least one of navigational data stored in said third means and topographical data stored in said fourth means during the third mode of operation; and
- display means, electrically coupled to said second generating means, for displaying a respective one of said 2D image, said first 3D image and said second 3D image and said terrain threat.

12. The stand alone terrain conflict detector as recited in claim 11, further comprising fifth means for storing a 3D terrain database, wherein a selected portion of at least one of said first and second 3D images is replaced by a corresponding 3D terrain image stored in said fifth means.

13. The stand alone terrain conflict detector as recited in claim 4, wherein said escape vector displayed in the third mode of operation corresponds to the projected flight path vector displayed in the second mode of operation, wherein maneuvers of the aircraft responsive to said guidable signal are reflected in said escape vector, and wherein the distal end of said escape vector terminates in a section of said second 3D image to thereby permit a pilot to determine whether or not said maneuver will cause the aircraft to avoid said terrain threat.

14. An operating method for a stand alone terrain conflict detector of an aircraft, the terrain conflict detector having a memory storing navigational data and topographical data and first, second and third modes of operation, the method comprising steps for:

(a) determining a first aircraft position from satellites;

(b) determining a second aircraft position inertially;

(c) determining aircraft acceleration;

(d) generating position data and a flight path vector responsive to control signals, at least one of said first and second aircraft positions, and said aircraft acceleration;

(e) generating a first signal indicative of a flight plan, and generating at least one of a second signal identifying a terrain threat to the aircraft when an obstacle is located within a predetermined distance of a projected flight path vector of the aircraft and a third signal indicative of a projected flight path vector responsive to said position data, said flight path vector, and said control signals;

(f) generating a distinctive audible signal responsive to said second signal;

(g) generating a two dimensional (2D) image responsive to said first signal and said navigational data during the first mode of operation;

(h) generating a first three dimensional (3D) image including the projected flight path vector responsive to said third signal and at least one of navigational data and topographical data during the second mode of operation;

(i) automatically generating, whenever said audible signal is generated, a second 3D image, including an escape vector, having a scale different than that of said first 3D image responsive to said third signal and at least one of the navigational data and the topographical data during the third mode of operation; and (j) selectively displaying a respective one of said 2D image, said first 3D image and said second 3D image and said terrain threat.

15. The operating method for the stand alone terrain conflict detector as recited in claim 14, wherein the memory stores 3D terrain data, and wherein said step (h) comprises generating a first three dimensional (3D) image including the projected flight path vector responsive to said third signal and at least one of the navigational data, the topographical data and the 3D terrain data during the second mode of operation.

16. The operating method for the stand alone terrain conflict detector as recited in claim 14, wherein the memory stores 3D terrain data base, and wherein said step (i) comprises automatically generating, whenever said audible signal is generated, a second 3D image, including an escape vector, having a scale different than that of said first 3D image, responsive to said third signal and at least one of the navigational data, the topographical data, and the 3D terrain data during the third mode of operation.

17. The operating method for the stand alone terrain conflict detector as recited in claim 14, wherein said escape vector displayed in the third mode of operation corresponds to the projected flight path vector displayed in the second mode of operation, wherein maneuvers of the aircraft responsive to said audible signal are reflected in said escape vector, and wherein the distal end of said escape vector terminates in a section of said second 3D image to thereby permit a pilot to determine whether or not said maneuver will cause the aircraft to avoid said terrain threat.

* * * * *